United States Patent
Ohkawa

(10) Patent No.: US 11,131,952 B2
(45) Date of Patent: Sep. 28, 2021

(54) PRINT CONTROL APPARATUS, PRINTER, DISPLAY APPARATUS, AND PRINT SYSTEM FOR MANAGING A PRINT JOB BASED UPON A COMPLETION CONDITION

(71) Applicant: FUJIFILM BUSINESS INNOVATION CORP., Tokyo (JP)

(72) Inventor: Kazuhiro Ohkawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 53 days.

(21) Appl. No.: 16/027,621

(22) Filed: Jul. 5, 2018

(65) Prior Publication Data
US 2019/0025745 A1 Jan. 24, 2019

(30) Foreign Application Priority Data
Jul. 19, 2017 (JP) .............................. JP2017-139623

(51) Int. Cl.
G03G 15/00 (2006.01)
G06F 3/12 (2006.01)
(52) U.S. Cl.
CPC ..... *G03G 15/5087* (2013.01); *G03G 15/6585* (2013.01); *G06F 3/1203* (2013.01); *G06F 3/1207* (2013.01); *G06F 3/1256* (2013.01); *G03G 2215/00801* (2013.01)
(58) Field of Classification Search
None
See application file for complete search history.

(56) References Cited

U.S. PATENT DOCUMENTS

| 4,774,567 | A | * | 9/1988 | Stansfield | H04N 1/54 358/501 |
| 6,211,895 | B1 | * | 4/2001 | Asabe | B41J 31/00 347/212 |
| 8,145,088 | B2 | | 3/2012 | Morooka | |
| 8,310,707 | B2 | | 11/2012 | Nakaso | |
| 2002/0033872 | A1 | * | 3/2002 | Takahashi | B41J 29/38 347/110 |
| 2002/0105669 | A1 | * | 8/2002 | Watanabe | H04N 1/32635 358/1.14 |

(Continued)

FOREIGN PATENT DOCUMENTS

| JP | 2007001264 A | * | 1/2007 |
| JP | 2008-151971 A | | 7/2008 |

(Continued)

OTHER PUBLICATIONS

JP-2010143199-A English Translation, Kamiwano, Abstract [see Non-Final Rejection] (Year: 2010).*

(Continued)

*Primary Examiner* — Miya J Williams
(74) *Attorney, Agent, or Firm* — Oliff PLC

(57) ABSTRACT

A print control apparatus includes a completion condition obtaining unit and a management unit. The completion condition obtaining unit obtains, when executing a print job for printing one or more pages satisfying a predetermined condition, a completion condition of the print job. The management unit manages the print job as uncompleted until the obtained completion condition is satisfied even when a recording material on which the one or more pages are printed is ejected.

18 Claims, 14 Drawing Sheets

(56) References Cited

U.S. PATENT DOCUMENTS

| | | | |
|---|---|---|---|
| 2008/0145071 A1 | 6/2008 | Ogasawara | |
| 2009/0046136 A1* | 2/2009 | Choi | B41J 35/28 |
| | | | 347/214 |
| 2009/0257760 A1* | 10/2009 | Kaneda | G03G 15/6585 |
| | | | 399/18 |
| 2011/0063699 A1* | 3/2011 | Ishizuka | H04N 1/6016 |
| | | | 358/530 |
| 2018/0089545 A1* | 3/2018 | Ikeda | G03G 15/607 |
| 2018/0297358 A1* | 10/2018 | Ogura | B41J 25/001 |

FOREIGN PATENT DOCUMENTS

| | | | |
|---|---|---|---|
| JP | 2009-251692 A | | 10/2009 |
| JP | 2010-079223 A | | 4/2010 |
| JP | 2010143199 A | * | 7/2010 |
| JP | 2014-084193 A | | 5/2014 |
| JP | 2017-058878 A | | 3/2017 |
| JP | 2017-062308 A | | 3/2017 |

OTHER PUBLICATIONS

JP-2007001264-A English Translation, Kato, Abstract, Figs 15, 16 and corresponding paragraphs (Year: 2007).*
Apr. 20, 2021 Office Action issued in Japanese Patent Application No. 2017-139623.

* cited by examiner

FIG. 5

Job Properties — W2

Detailed Settings

- ☑ Use special toner — 231
- Number of times of overprinting
  233 → 5
  235 [−] 234 [+] (0 - 99)
- Number of times overprinting is executed
  236 → 3
- Toner(s) to be used in overprinting
  [Only special toner (front) ▾] — 232
- ☑ Use special toner for special color

FIG. 8

| ID | Job name | Format | Overprint | Size | RIP type | Template | Reception start date | Pending date |
|---|---|---|---|---|---|---|---|---|
| 1 | 1page.ps | PostScript | 1/2 | 1 KB | CPSI 3020 | template_def... | 02/06/2017 11:1... | 02/06/2017 11:1... |
| 2 | A_4P.pdf | PDF | 3/5 | 226 KB | CPSI 3020 | template_def... | 02/06/2017 11:1... | 02/06/2017 11:1... |
| 3 | A3_5pages.ps | PostScript | 1/5 | 1 KB | CPSI 3020 | template_def... | 02/06/2017 11:1... | 02/06/2017 11:1... |
| 4 | A4_L_5PAGE.pdf | PDF | 2/4 | 839 KB | CPSI 3020 | template_def... | 02/06/2017 11:1... | 02/06/2017 11:1... |
| 5 | A4_P_20PAGE.pdf | PDF | 3/4 | 2,731 KB | CPSI 3020 | template_def... | 02/06/2017 11:1... | 02/06/2017 11:1... |

Pending: 5 | Error: 0 | Completed: 0 | Overprint uncompleted: 5

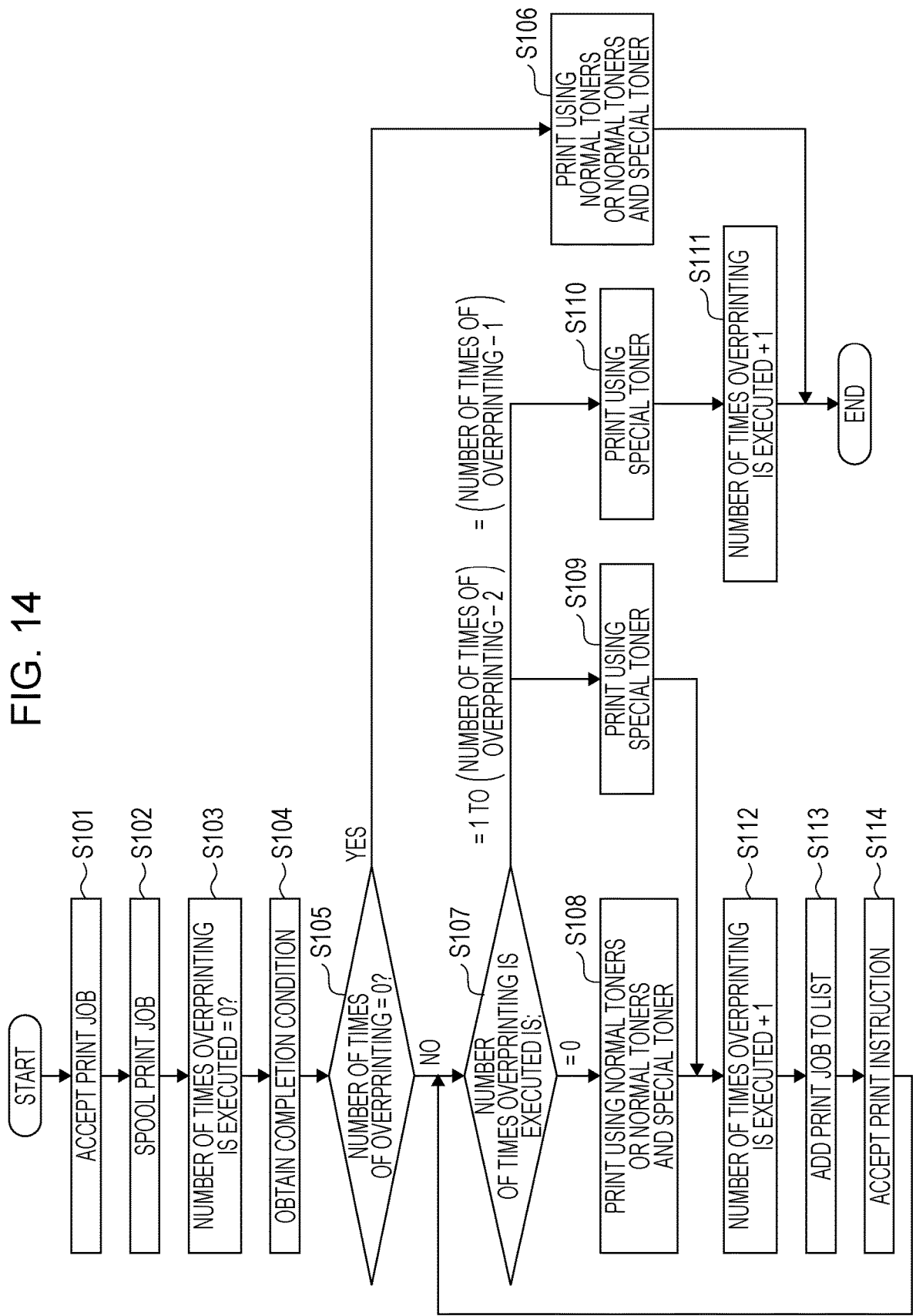

PRINT CONTROL APPARATUS, PRINTER, DISPLAY APPARATUS, AND PRINT SYSTEM FOR MANAGING A PRINT JOB BASED UPON A COMPLETION CONDITION

CROSS-REFERENCE TO RELATED APPLICATIONS

This application is based on and claims priority under 35 USC 119 from Japanese Patent Application No. 2017-139623 filed Jul. 19, 2017.

BACKGROUND

(i) Technical Field

The present invention relates to a print control apparatus, a printer, a display apparatus, and a print system.

(ii) Related Art

A print system has been available in which a print management apparatus manages a print job, and, in response to transmission of the print job from the print management apparatus to a printer, the printer performs printing. In some cases, printing is performed by the printer when a print control apparatus receives a print job and controls a print unit that actually performs printing on a recording material.

In such a print system, on receipt of multiple print jobs from the print management apparatus, the print control apparatus processes the print jobs in, for example, the order of reception to perform printing. It is generally regarded that one print job is completed when a specified number of pages are printed and a recording material is ejected.

However, for example, as in the case of additional printing that performs printing multiple times on each page, the entire printing process may not be completed in one print operation. When it is regarded that a print job is completed at the time a specified number of pages are printed and a recording material is ejected, in spite of the fact that the print job is actually being processed, the print job is treated as completed.

SUMMARY

According to an aspect of the invention, there is provided a print control apparatus including a completion condition obtaining unit and a management unit. The completion condition obtaining unit obtains, when executing a print job for printing one or more pages satisfying a predetermined condition, a completion condition of the print job. The management unit manages the print job as uncompleted until the obtained completion condition is satisfied even when a recording material on which the one or more pages are printed is ejected.

BRIEF DESCRIPTION OF THE DRAWINGS

An exemplary embodiment of the present invention will be described in detail based on the following figures, wherein:

FIG. 5 is a diagram illustrating a first exemplary screen of job properties for obtaining a completion condition;

FIG. 8 is a diagram illustrating a second example where the display unit performs display reflecting the number of times of additional printing;

FIG. 14 is a flowchart describing the operation of the controller.

DETAILED DESCRIPTION

Description of Overall Configuration of Print System

Hereinafter, an exemplary embodiment of the present invention will be described in detail with reference to the accompanying drawings.

Figure 1:
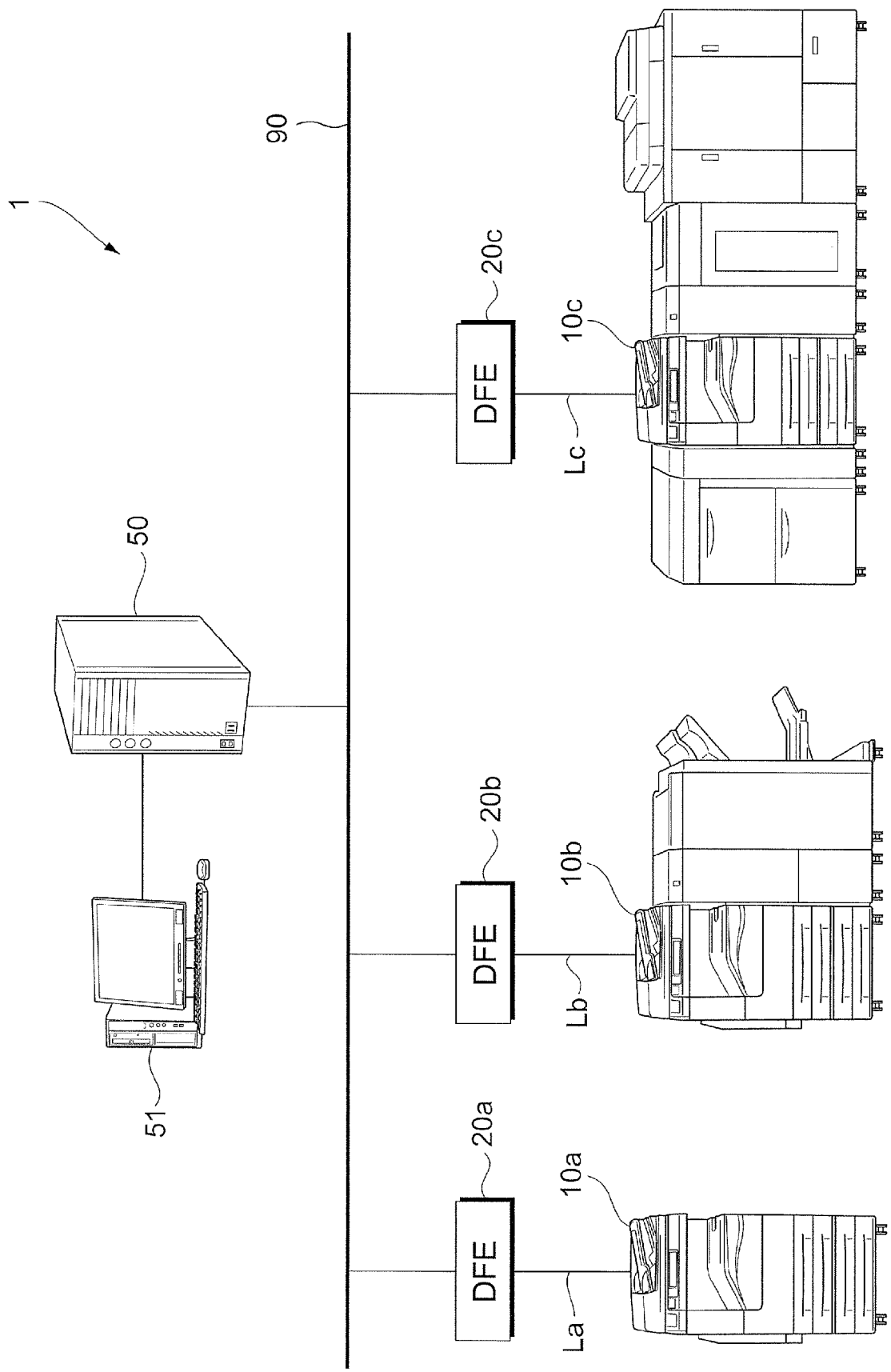
FIG. 1 illustrates an exemplary overall configuration of a print system to which an exemplary embodiment is applied.

FIG. 1 illustrates an exemplary overall configuration of a print system to which an exemplary embodiment is applied.

A print system 1 illustrated in FIG. 1 includes image forming apparatuses 10a, 10b, and 10c, which are connected to a network 90 via controllers 20a, 20b, and 20c, respectively. In addition, a print server 50 is connected to the network 90.

Although FIG. 1 illustrates the image forming apparatuses 10a, 10b, and 10c, they may be collectively referred to as "image forming apparatuses 10" when it is unnecessary to distinguish them. Furthermore, although FIG. 1 illustrates the controllers 20a, 20b, and 20c, they may be collectively referred to as "controllers 20" when it is unnecessary to distinguish them.

Although FIG. 1 illustrates three image forming apparatuses 10 and three controllers 20 corresponding to these image forming apparatuses 10, the number of them is not particularly limited unless there is at least one image forming apparatus 10 and one controller 20.

The image forming apparatuses 10 are an example of a print unit. Each image forming apparatus 10 is an apparatus that performs printing by forming an image on a recording material (a recording medium or paper) using a color material, and that outputs the recording material as a print medium.

Each image forming apparatus 10 obtains print data from a corresponding one of the controllers 20, and performs printing by forming an image on a recording material using a color material on the basis of the obtained print data. Each image forming apparatus 10 outputs the printed recording material as a print medium. The system for forming an image on a recording material in the present exemplary embodiment is not particularly limited. Various systems are available, such as an electrophotographic system using toner as a color material, and an inkjet system using ink as a color material.

Although the image forming apparatuses 10 may be apparatuses that only have a print function, the image forming apparatuses 10 may be apparatuses that have other image processing functions, such as a scanner function and a facsimile function, in addition to a print function. In other words, each of the image forming apparatuses 10 may have, besides an image forming unit that is responsible for a print function and that forms an image on a recording material, an image reading unit that is responsible for a scanner function and that reads a document, and an image transmitting unit that is responsible for a facsimile function and that transmits an image. In addition, each image forming apparatus 10 includes a control unit for controlling all of these function units.

Each controller 20 manages printing performed by a corresponding one of the image forming apparatuses 10. Each controller 20 is an example of a print control apparatus (print controller) that controls a corresponding one of the image forming apparatuses 10 on the basis of a print job, and is realized by, for example, a personal computer provided with a network function. Each controller 20 may alternatively be referred to as a digital front end (DFE). Therefore, each controller 20 is indicated as "DFE" in FIG. 1. Each controller 20 receives a print job from the print server 50 and spools the print job. Each controller 20 transmits the spooled print job to a corresponding one of the image forming apparatuses 10, and causes the image forming apparatus 10 to execute a printing process. Here, the term "print job" is a unit of processing created for performing printing with an image forming apparatus. There are cases in which one print job is generated for one printing process, and one print job that is divided into multiple sub-jobs is generated for one printing process. The present exemplary embodiment will mainly deal with the former type of print job. Data in a print job includes print data and data other than the print data. For example, data in a print job includes print job name data indicating the start of the print job, paper type data indicating a paper name and a model number for specifying a paper size and a paper quality, print data itself which is data for forming an image on a recording material, and data representing the end of the print job.

The image forming apparatuses 10 and the controllers 20 are connected by data transmission lines La, Lb, and Lc, respectively. The data transmission lines La, Lb, and Lc are, for example, normal copper wire cables, and perform communication according to communication standards such as Universal Serial Bus (USB), the Institute of Electrical and Electronics Engineers, Inc. (IEEE) 1394, or Recommended Standard (RS) 232C. When the image forming apparatuses 10 are, for example, high-speed printers and high-speed communication is therefore necessary, optical fibers may be used as the data transmission lines La to Lc to perform Digital Visual Interface (DVI) optical transmission. Accordingly, a transmission rate of 10 gigabit per second (Gbps) or greater may be realized. Wireless communication may be adopted as a connection form between the image forming apparatuses 10 and the controllers 20; in this case, the data transmission lines La, Lb, Lc are not physical data transmission lines. In the present exemplary embodiment, the image forming apparatuses 10 and the controllers 20 may be regarded together as printers.

The print server 50 is an example of a print management apparatus that transmits a print job to each of the controllers 20 and manages the progress of the print job. The print server 50 is realized by, for example, a computer provided with a network function, and spools a print job. The print server 50 accepts a print instruction, generates a print job specified by the print instruction, and transmits the print job to one of the controllers 20. A print instruction is input from, for example, a terminal apparatus 51 connected to the print server 50. The terminal apparatus 51 is realized by, for example, a personal computer provided with an input device such as a keyboard. Although only one terminal apparatus 51 is illustrated in FIG. 1, there may be multiple terminal apparatuses 51. Although the terminal apparatus 51 is directly connected to the print server 50, the terminal apparatus 51 may be connected to the print server 50 via the network 90.

In the present exemplary embodiment, the print server 50 may be regarded as a higher-level apparatus, and the controllers 20 may be regarded as lower-level apparatuses.

The network 90 is a communication network used for information communication between the controllers 20 and the print server 50, and is, for example, a local area network (LAN). The network 90 is not limited to a LAN, and may be, for example, the Internet, or may be a network based on wireless communication.

Print data in a print job transmitted from the print server 50 is subjected to signal processing by one of the controllers 20 and one of the image forming apparatuses 10.

Figure 2:
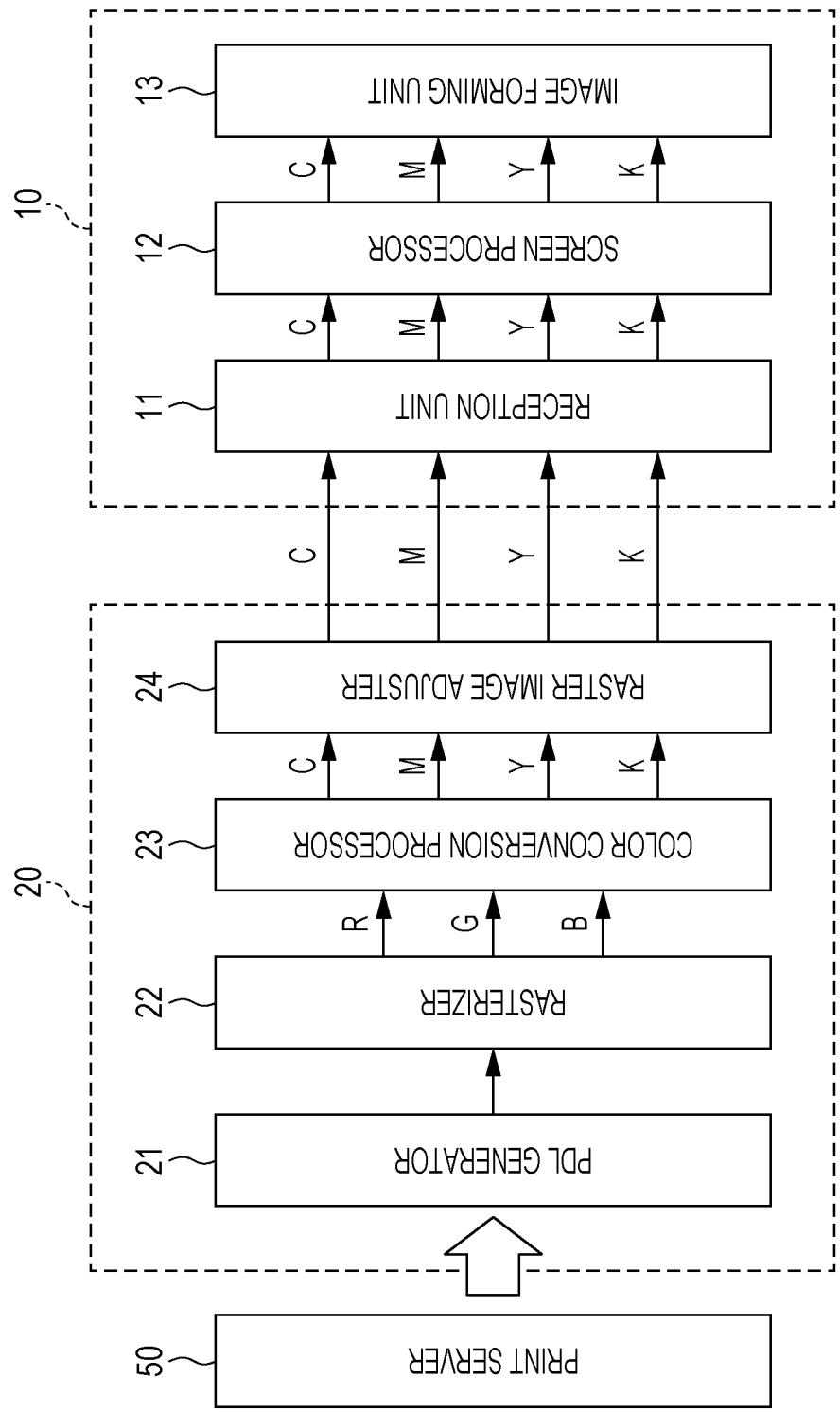
FIG. 2 is a block diagram illustrating the flow of an image signal from a print server to a controller and to an image forming apparatus.

FIG. 2 is a block diagram illustrating the flow of an image signal from the print server 50 to the controller 20 and to the image forming apparatus 10.

The controller 20 includes the following units: a page description language (PDL) generator 21, which receives print data and converts the print data to PDL data; a rasterizer 22, which creates a raster image from the PDL data generated by the PDL generator 21; a color conversion processor 23, which converts red-green-blue (RGB) data to cyan-magenta-yellow-key (black) (CMYK) data; and a raster image adjuster 24, which adjusts the raster image obtained by conversion performed by the color conversion processor 23.

In the present exemplary embodiment, at first, the PDL generator 21 receives print data from the print server 50. Having received the print data, the PDL generator 21 converts the print data to code data described in PDL and outputs the PDL code data.

The rasterizer 22 converts the code data described in PDL, output from the PDL generator 21, to raster data in units of pixels, and obtains a raster image. The rasterizer 22 outputs the converted raster data as RGB video data. At this time, the rasterizer 22 outputs the RGB data on a page by page basis.

The color conversion processor 23 converts the RGB data, input from the rasterizer 22, to device-independent color values, such as [XYZ], [L*a*b], or [L*u*v*], converts the color values to data of the reproducible colors of the image forming apparatus 10 (such as cyan, magenta, yellow, and black), namely, CMYK data, and outputs the CMYK data. The CMYK data includes C-color data, M-color data, Y-color data, and K-color data, separated on a color by color basis. Note that the reproducible colors of the image forming apparatus 10 are not limited to cyan, magenta, yellow, and black, which will be described in detail later.

The raster image adjuster 24 applies γ conversion, definition processing, halftone processing, and the like to the CMYK data, input from the color conversion processor 23, thereby performing various adjustments for the image forming apparatus 10 to obtain a better image quality.

The image forming apparatus 10 includes an accepting unit 11, which accepts raster data from the controller 20, and a screen processor 12, which performs screen processing.

The accepting unit 11 accepts print data expanded (rasterized) as a set of pixels. That is, the rasterizer 22, which performs rasterizing as described above, is included in the controller 20, which is an external apparatus. Therefore, the image forming apparatus 10 receives the rasterized print data and performs printing on the basis of the rasterized print data.

In other words, when the controller 20, which is an external apparatus, performs rasterizing and adjustment of a raster image, as in the present exemplary embodiment, the controller 20, which is capable of performing, for example, more sophisticated processing may be used. Therefore, a better image may be formed with the image forming apparatus 10.

The screen processor 12 performs screen processing of print data by performing dither mask processing using a dither mask that has a predetermined threshold arrangement in the main-scanning and sub-scanning directions. Accordingly, the print data changes from, for example, multi-valued data to binary data.

Description of Functional Configuration of Print Server 50, Controller 20, and Image Forming Apparatus 10

Figure 3:
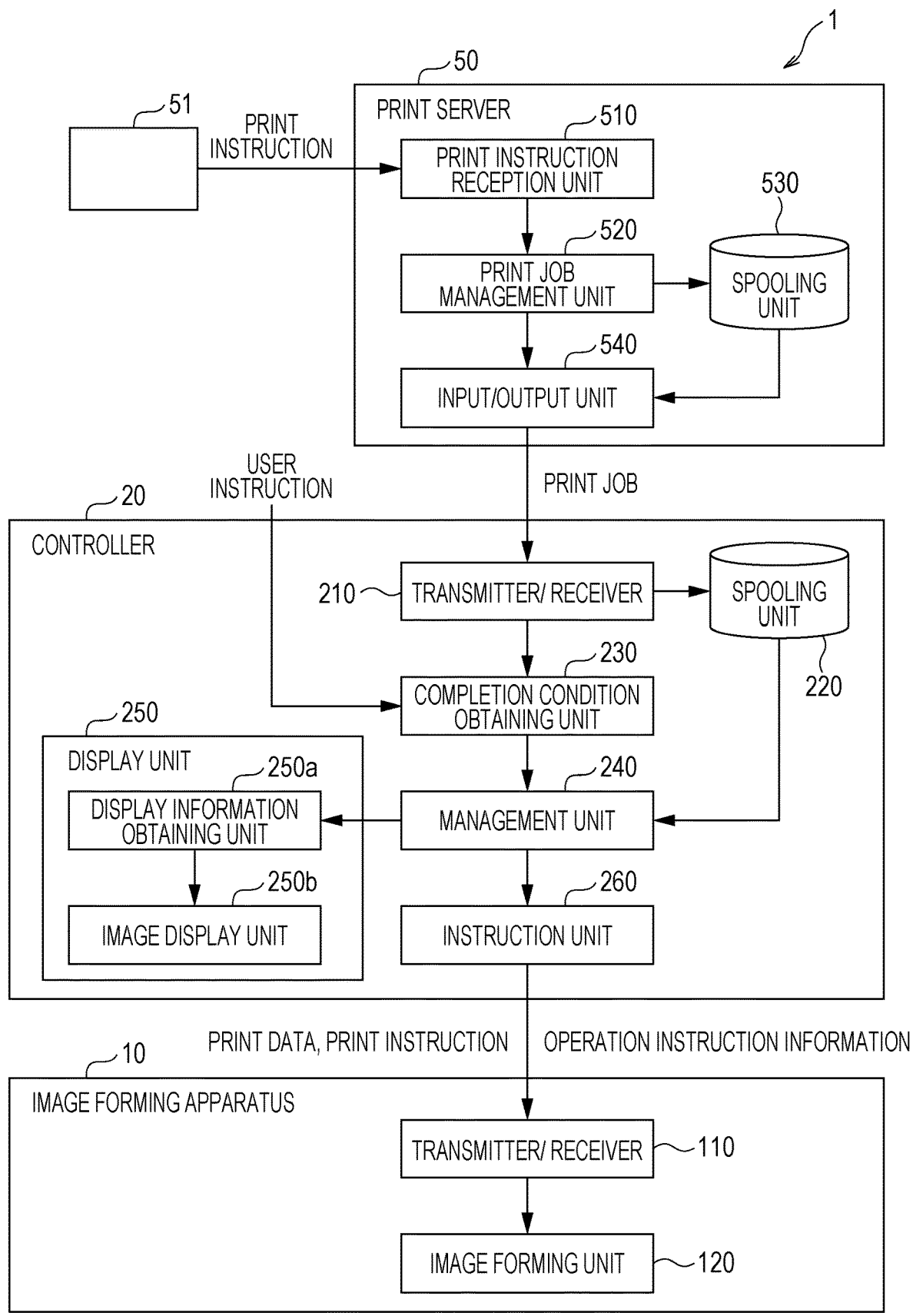
FIG. 3 is a block diagram illustrating an exemplary functional configuration when the print server, the controller, and the image forming apparatus are viewed from the functional configuration.

FIG. 3 is a block diagram illustrating an exemplary functional configuration when the print server 50, the controller 20, and the image forming apparatus 10 are viewed from the functional configuration.

Here, among various functions of the print server 50, the controller 20, and the image forming apparatus 10, those related to the present exemplary embodiment are selectively illustrated.

The illustrated print server 50 includes the following units: a print instruction accepting unit 510, which accepts a print instruction; a print job management unit 520, which manages a print job; a spooling unit 530, which spools a print job; and an input/output unit 540, which outputs a print job.

The print instruction accepting unit 510 obtains a print instruction and print data from the terminal apparatus 51 connected to the print server 50 on a print job by print job basis.

The print job management unit 520 performs input/output management of a print job. That is, the print job management unit 520 analyzes the print settings of a print job, and determines the image forming apparatus 10 that executes the print job. In addition, the print job management unit 520 manages the order of processing print jobs, the time for performing printing, and so forth. Furthermore, the print job management unit 520 manages the completed/uncompleted status of a print job. In addition, the print job management unit 520 performs editing processing to edit print data to be in an output form that suits the image forming apparatus 10.

The spooling unit 530 temporarily spools a print job accepted by the print job management unit 520. Because the processing speed of the image forming apparatus 10, which physically forms an image on a recording material, is lower than the data processing speed of the print server 50, a print job is spooled to absorb the speed difference. Therefore, when multiple print instructions are given in a short period of time, multiple print jobs corresponding to these print instructions may be spooled in the spooling unit 530. The spooled print jobs are sequentially read out to the input/output unit 540 under management of the print job management unit 520 once the image forming apparatus 10 becomes ready to accept print data.

In accordance with management items such as the order of processing the print jobs and the time for performing printing, which are determined by the print job management unit 520, the input/output unit 540 sequentially obtains the print jobs spooled in the spooling unit 530. The input/output unit 540 transmits a print job to the controller 20 of the image forming apparatus 10 determined by the print job management unit 520 to execute printing. When processing of the print job is completed, the input/output unit 540 is notified by the controller 20 of the completion of the print job, and transmits this notification to the print job management unit 520.

The controller 20 includes the following units: a transmitter/receiver 210, which accepts a print job; a spooling unit 220, which spools a print job; a completion condition obtaining unit 230, which obtains a completion condition of a print job; a management unit 240, which manages a print job; a display unit 250, which displays information regarding printing; and an instruction unit 260, which gives a print instruction to the image forming apparatus 10.

The transmitter/receiver 210 accepts a print job from the input/output unit 540. When the print job is uncompleted, the transmitter/receiver 210 notifies the print server 50 of the fact that the print job is uncompleted. In contrast, when the print job is completed, the transmitter/receiver 210 notifies the print server 50 of the fact that the print job is completed.

The spooling unit 220 temporarily spools a print job accepted by the transmitter/receiver 210. Print jobs are sequentially output in accordance with the processing circumstances of the image forming apparatus 10 or in response to an instruction given from a user who operates the printer, and a printing process is performed.

In the case of executing a print job for printing one or more pages satisfying a predetermined condition, the completion condition obtaining unit 230 obtains a completion condition of the print job. The completion condition may be input by a user who operates the printer, which will be described in detail later. Alternatively, the completion condition obtaining unit 230 may obtain the completion condition by analyzing the details of the print job.

The management unit 240 manages the progress status of a print job. When printing is executable with the image forming apparatus 10, the management unit 240 applies control to obtain print data spooled in the spooling unit 220, and to sequentially output the print data to the image forming apparatus 10. In addition, when the image forming apparatus 10 is unable to accept a print job, the management unit 240 waits until the image forming apparatus 10 becomes ready to accept a print job. When multiple print jobs are spooled in the spooling unit 220, the management unit 240 sequentially obtains the spooled print jobs, or, in response to an instruction given from a user who operates the printer, transmits the print jobs to the image forming apparatus 10.

The display unit 250 is an example of a display apparatus and displays the print settings and the progress status of printing. The display unit 250 is, for example, a touchscreen. In this case, the display unit 250 includes a display information obtaining unit 250*a*, which obtains display information for displaying an image. In addition, the display unit 250 includes an image display unit 250*b*, such as a liquid crystal panel or the like, which displays content (information details) in a predetermined area on the basis of the display information. The display unit 250 has a function of detecting, when a contact object represented by a person's finger or a stylus pen contacts the liquid crystal panel, a position at which the contact object contacts the liquid crystal panel.

The instruction unit 260 transmits print data for performing printing with the image forming apparatus 10. In addition, the instruction unit 260 gives a print instruction to the image forming apparatus 10. The instruction unit 260 changes the amount of a color material, the order of pages to be printed, and the print details on the basis of the details of a print job, which will be described in detail later.

The image forming apparatus 10 includes a transmitter/receiver 110, which obtains print data, and an image forming unit 120, which performs printing by forming an image on a recording material.

The transmitter/receiver 110 receives a print instruction along with print data from the instruction unit 260. The transmitter/receiver 110 gives a completion notification when printing is completed.

The image forming unit 120 forms an image on a recording material using a color material such as toner or ink, and outputs the recording material as a print medium.

There are some print jobs for performing, for example, printing multiple times on each page.

A specific example of such a print job includes one that uses normal color materials that are color materials used normally and a special color material that is used specially for the print job. The term "normal color materials" refers to color materials that have normally-used colors for forming an image with the image forming apparatus 10. The normal color materials include color materials that have three primary colors. Furthermore, the normal color materials commonly include K (black). Specifically, when the normal color materials are toners, for example, these toners are cyan (C), magenta (M), yellow (Y), and key (K; black) toners. The term "special color material" refers to a color material having a color that is not reproducible with the normal color materials when forming an image with the image forming apparatus 10. In other words, the special color toner is a color toner used to add a special effect to an image formed when forming an image with the image forming apparatus 10. When the special color material is a toner, an example of the special color material includes a clear toner that is used to enhance the luster and that has a clear color. Another example includes a metallic toner that is used to enhance the metallic luster and that has a gold or silver color. A yet another example includes a white toner that is used to enhance the whiteness and that has a white color. When a color that is reproducible using the normal color materials requires the accurate color reproduction, as in a corporate color, a toner referred to as a spot color, which is used for reproducing a specific color, is used.

Hereinafter, when normal color materials are toners, they may be referred to as "normal toners". When a special color material is a toner, it may be referred to as a "special toner". Although the above description assumes that the color materials are toners, the color materials may be ink.

The case where printing is performed multiple times on each page is not limited to the case of using a special color material. For example, even when printing is performed using only normal color materials, printing may be done multiple times in order to avoid exceeding the total amount regulation of color materials, which will be described later. In some cases, a pattern serving as the background is printed in the first print operation, and then normal printing is performed.

Figure 4:
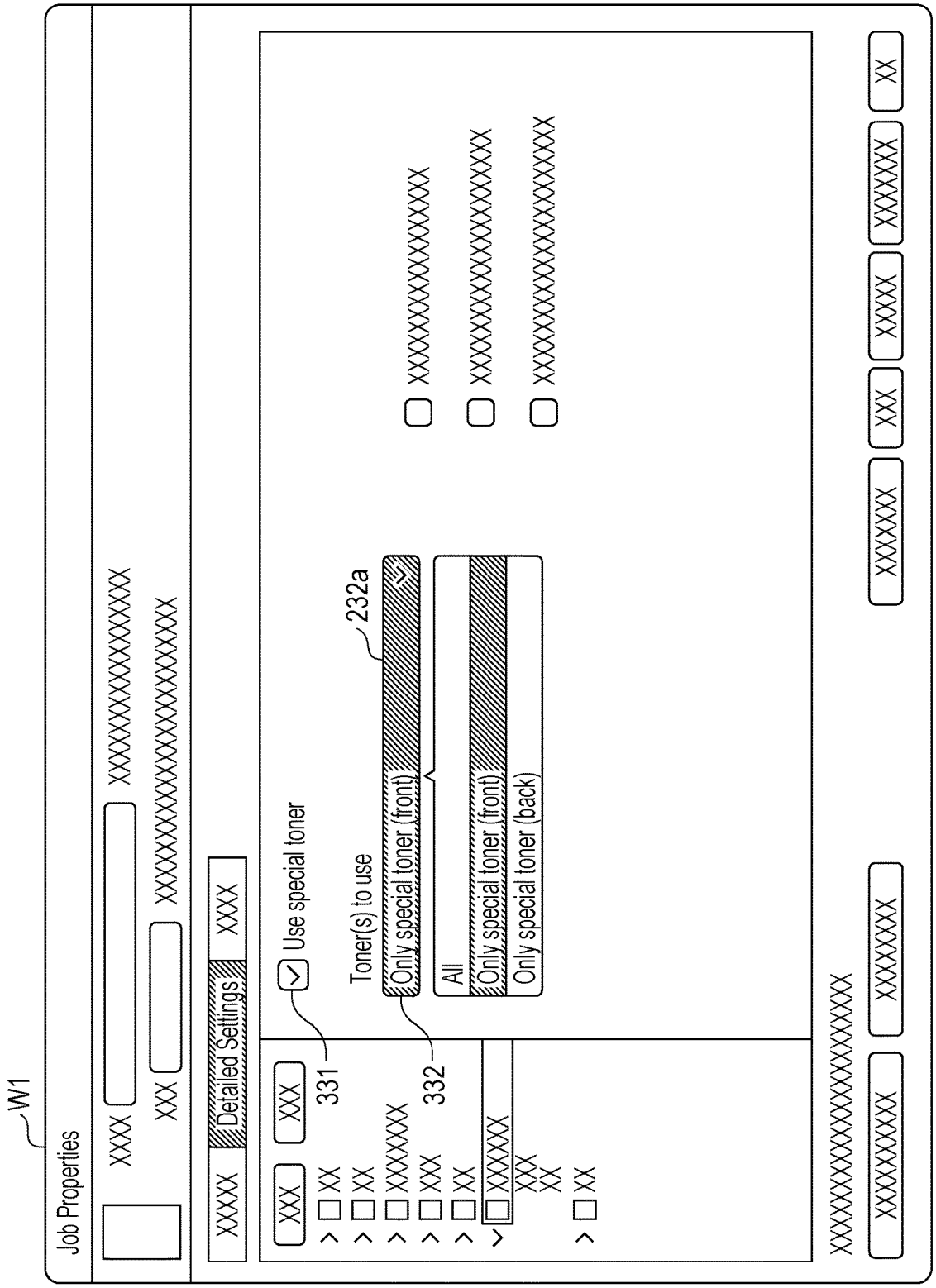
FIG. 4 is a diagram illustrating an exemplary screen of the related art for setting job properties.

FIG. 4 is a diagram illustrating an exemplary screen of the related art for setting job properties.

The illustrated example describes the case where a window W1 for setting job properties is opened on the display unit 250. In this window W1, in the case of using a clear tone as a special toner, it may be set up to perform overcoat printing and undercoat printing. The term "overcoat printing" refers to performing printing using normal toners and also performing printing using a special toner on the normal toners. In other words, printing is performed such that the special toner will be positioned on the normal toners. The term "undercoat printing" refers to performing printing using a special toner and also performing printing using normal toners on the special toner. In other words, printing is performed such that the special toner will be positioned under the normal toners.

The user is able to set up to "use special toner" by checking a checkbox 331 in the window W1. By checking the checkbox 331, the user is able to operate a pull-down menu 332. From the pull-down menu 332, the user is able to select one of "all", "only special toner (front)", and "only special toner (back)" as the toner(s) to use. Among these options, "all" is selected when using both the normal toners and the special toner. In addition, "only special toner (front)" is selected when performing overcoat printing using the special toner. Furthermore, "only special toner (back)" is selected when performing undercoat printing using the special toner.

When the user wants to perform undercoat printing using the special toner, normal printing using the normal toners, and overcoat printing using the special toner, the user first selects "all" in this window W1, and printing is performed. Accordingly, undercoat printing and normal printing are performed. Then, the user selects "only special toner (front)" in the window W1, and printing is performed again. In doing so, overcoat printing is performed. In other words, in this case, because undercoat printing and overcoat printing are unexecutable in one print operation, it is necessary to perform undercoat printing and overcoat printing separately in two print operations.

However, it may be determined that the print job is completed at the time the first print operation is performed. In other words, in the case of performing printing multiple times on each page, printing for the number of pages set in the print job is completed at the time the first print operation is done, and the print medium is once ejected to an ejection tray or the like. To perform the second print operation, it is necessary for a user who operates the image forming apparatus 10 to re-set the print medium, which is on the ejection tray, in a paper feeding tray, and to perform the second print operation.

Normally, a print job is regarded as completed when a specified number of pages are output and a print medium is ejected to the ejection tray or the like. Therefore, a print job may be regarded as completed despite the fact that printing is actually in progress. In other words, in the case of job properties such as those illustrated in FIG. 4, because the controller 20 is unable to determine whether a print job is completed or printing is still in progress at the time a print medium is ejected to the ejection tray or the like, the controller 20 is unable to determine that printing is still in progress.

There are cases where it is set to delete a print job after the print job is completed. In these cases, when a print job is deleted at the time the first print operation is done, the second and further print operations will not be performed. Furthermore, in the case of performing post-processing after printing is done, post-processing starts when the first print operation is done. Note that the term "post-processing" refers to additional processing performed on a print medium printed by the image forming apparatus 10. Post-processing includes processing to process a print medium and processing to sort a print medium. Examples of processing to process a print medium include stapling, folding, and binding. An example of processing to sort a print medium includes processing to eject sorted portions of a print medium to different ejection trays.

In the present exemplary embodiment, these problems are avoided by obtaining a completion condition of a print job, and managing the print job as uncompleted until the completion condition is satisfied.

Description of Completion Condition Obtaining Unit 230

In the present exemplary embodiment, as has been described above, the completion condition obtaining unit 230 obtains a completion condition of a print job. Here, the term "completion condition" refers to a condition for determining that a print job is completed. With regard to the completion condition, completion of the entire printing process may be set as the completion condition, or the completion condition may be satisfied even when the entire printing process is not completed. In the latter case, for example, the case where the number of pages printed by a user or the usage time reaches a preset upper limit is set as the completion condition. The completion condition in the present exemplary embodiment mainly refers to the former case.

When a print job is one for performing printing multiple times on each page, the completion condition is the number of times of printing or the number of times of additional printing on each page. Here, the term "the number of times of printing on each page" refers to the total number of times of printing on each page. In other words, when printing is performed on each page a total of two times, the number of times of printing is two times. In addition, the term "the number of times of additional printing on each page" refers to the number of times of additionally performing printing. In other words, when printing is performed on each page a total of two times, the number of times of additional printing is one time. In short, when a print job is one for performing printing multiple times on each page, it may be necessary to add printing equivalent to the number of times of additional printing for each page, and then perform printing the above-mentioned number of times of printing. Therefore, in this case, it is preferable that the completion condition be the number of times of printing or the number of times of additional printing on each page. In the case of additionally performing printing, this printing may be referred to as "overprinting" hereinafter. In the case of performing full-color printing using normal color materials of four colors (CMYK), there are cases where full-color printing is performed by performing recording on a recording material such as paper a total of four times for the individual CMYK colors. However, in the description of the present exemplary embodiment, this printing is not regarded as four print operations, but is regarded as one print operation.

The completion condition obtaining unit 230 obtains a completion condition in response to, for example, a user input.

FIG. 5 is a diagram illustrating a first exemplary screen of job properties for obtaining a completion condition.

The illustrated example describes the case where a window W2 for setting job properties is opened on the display unit 250. In this window W2, in the case of using a clear toner as a special toner, the number of times of overprinting is settable. The user is able to set up to "use special toner" by checking a checkbox 231 in the window W2. By checking the checkbox 231, the user is able to operate a pull-down menu 232, as in the case illustrated in FIG. 4. In this case, the user has selected, as a toner to be used in overprinting, "only special toner (front)" from the pull-down menu 232. Additionally, in the window W2, the user is able to set the number of times of overprinting 233. This number of times of overprinting 233 is the above-described number of times of additional printing, and the initial value is zero. By selecting a + button 234 or a − button 235, the user increases/decreases the numerical value to set the number of times of overprinting 233. Here, it is indicated that the number of times of overprinting 233 is five times. The completion condition obtaining unit 230 obtains the number of times of overprinting (the number of times of additional printing) as the completion condition. Additionally, in the window W2, the number of times overprinting is already executed 236 may be additionally displayed. Here, it is indicated that the number of times overprinting is already executed 236 is three times.

Figure 6:
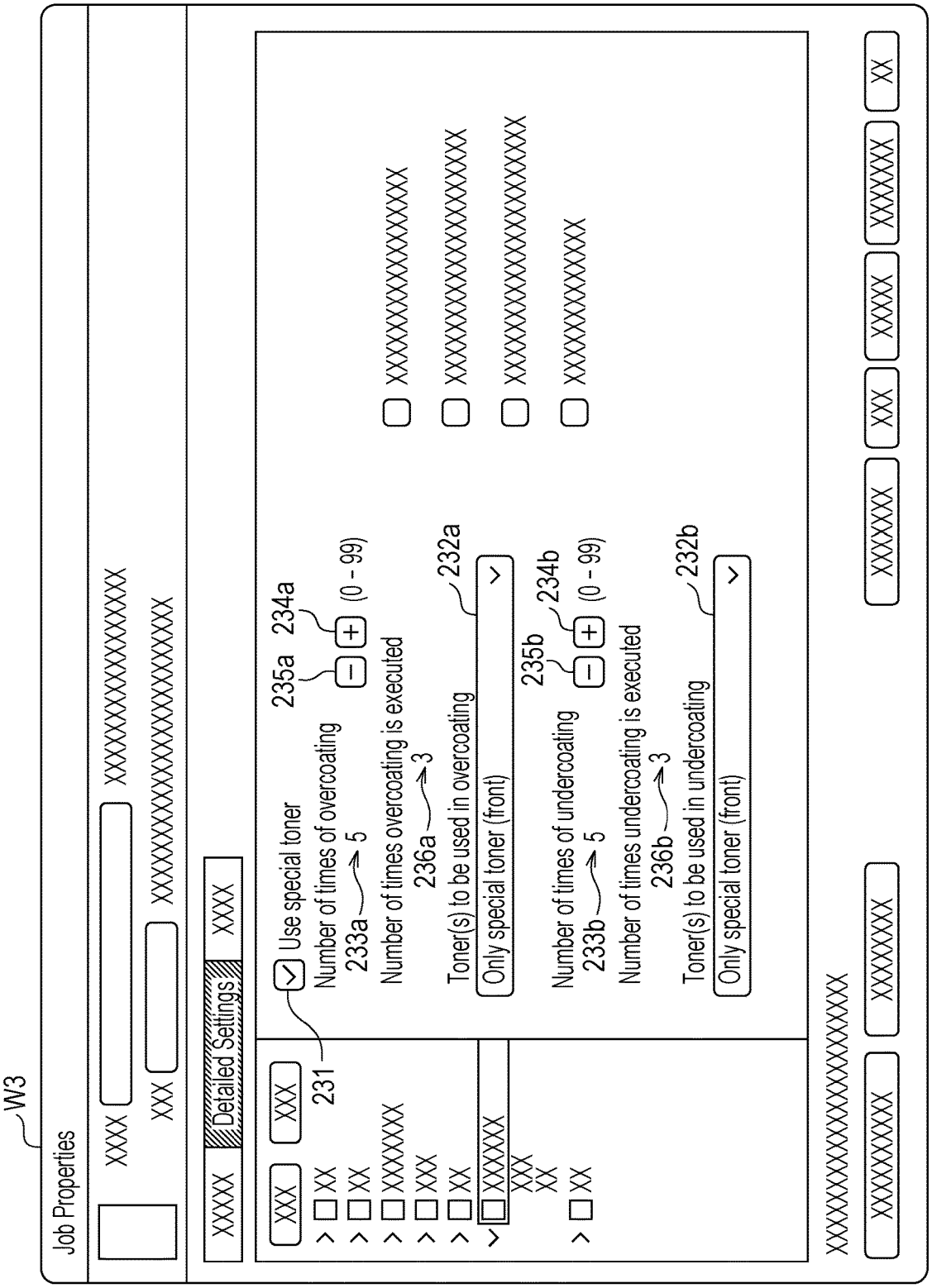
FIG. 6 is a diagram illustrating a second exemplary screen of job properties for obtaining a completion condition.

FIG. 6 is a diagram illustrating a second exemplary screen of job properties for obtaining a completion condition.

In these job properties, the number of times of additional printing, which serves as the completion condition, is separately obtained for overprinting the special toner on top of the normal toners and for overprinting the special toner on bottom of the normal toners.

The illustrated example describes the case where a window W3 for setting job properties is opened on the display unit 250. It is illustrated that, in these job properties, the user has checked the checkbox 231 and selected "only special toner (front)" from a pull-down menu 232a and a pull-down menu 232b. In this window W3, the number of times of overcoating 233a, which is the number of times of overprinting the special toner on top of the normal toners, and the number of times of undercoating 233b, which is the number of times of overprinting the special toner on bottom of the normal toners, are separately settable. The initial value of the number of times of overcoating 233a is zero. By selecting a + button 234a or a − button 235a, the user increases/decreases the numerical value to set the number of times of overcoating 233a. Here, it is indicated that the number of times of overcoating 233a is five times. Likewise, the initial value of the number of times of undercoating 233b is zero. By selecting a +button 234b or a − button 235b, the user increases/decreases the numerical value to set the number of times of undercoating 233b. Here, it is indicated that the number of times of undercoating 233b is five times. The completion condition obtaining unit 230 obtains the number of times of overcoating 233a and the number of times of undercoating 233b as the completion condition. Additionally, in the window W3, the number of times overcoating is already executed 236a and the number of times undercoating is already executed 236b may be additionally displayed. Here, it is indicated that the number of times overcoating is already executed 236a and the number of times undercoating is already executed 236b each are three times.

By setting the above-described job properties, the completion condition obtaining unit 230 is able to set the number of times of additional printing on each page, which serves as the completion condition. Although the number of times of additional printing on each page is obtained in the above-described example, the number of times of printing as a whole may be obtained. In this case, the initial value of the number of times of printing is one and increases by one every time printing such as overcoating or undercoating is added.

Although the user inputs a completion condition in the above-described example, for example, the completion condition obtaining unit 230 or the print server 50 may obtain a completion condition by analyzing a print job.

Description of Management Unit 240

As has been described above, the management unit 240 manages the progress status of a print job. In the present exemplary embodiment, the management unit 240 manages a print job as uncompleted until a completion condition obtained by the completion condition obtaining unit 230 is satisfied even when a recording material on which the preset number of pages are printed is ejected. That is, it is regarded that a print job is uncompleted until printing is performed the above-described number of times of overprinting (the number of times of overcoating and the number of times of undercoating).

Therefore, the management unit 240 does not execute the subsequent processing until the print job is completed.

Specifically, for example, even when there is a subsequent print job, this print job is not executed. That is, a subsequent print job is started after the above-mentioned completion condition is satisfied. Note that the user may give an interrupt instruction to process a print job. The point of "even when there is a subsequent print job, this print job is not executed" does not always prohibit an interrupt instruction.

In addition, post-processing is not executed even when it is necessary to perform post-processing after printing. That is, post-processing is started after the above-mentioned completion condition is satisfied.

Furthermore, for example, even when there is a setting to delete a print job after completion of the print job, deletion of the print job is not executed. That is, deletion of the print job is executed after the above-mentioned completion condition is satisfied.

In addition, in the case of recording the log of completion of printing of a print job, the management unit 240 does not record the log until the completion condition is satisfied. That is, the log of completion of printing is recorded after the above-mentioned completion condition is satisfied. However, when the completion condition is not satisfied and when printing is still in progress, the log indicating that printing is still in progress may be recorded.

When the print job does not satisfy the completion condition, the management unit 240 notifies the print server 50 that the print job is uncompleted even when a recording material on which the preset number of pages are printed is ejected. In other words, the management unit 240 notifies the print server 50 that the print job is completed only after the print job satisfies the completion condition.

Description of Display on Display Unit 250

It is preferable that the management unit 240 cause the display unit 250 to perform display reflecting the number of times of additional printing.

Figure 7:
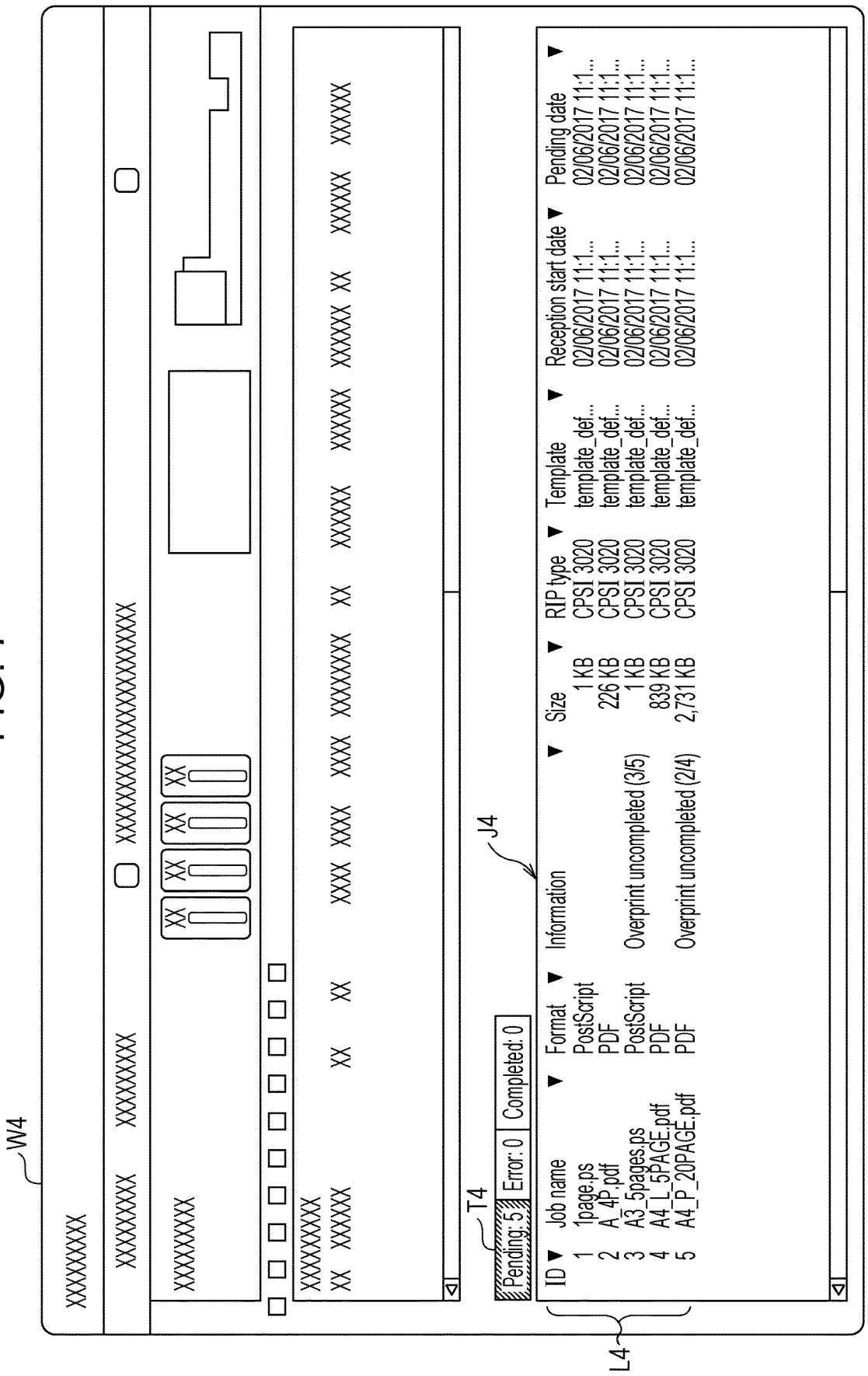
FIG. 7 is a diagram illustrating a first example where a display unit performs display reflecting the number of times of additional printing.

FIG. 7 is a diagram illustrating a first example where the display unit 250 performs display reflecting the number of times of additional printing.

The illustrated example describes the case where the display unit 250 displays a pending list L4, which is a list of print jobs whose progress status is pending, in a window W4. The list L4 is displayed when a pending tab T4 is selected. In this list L4, the progress status of IDs 1 to 5 serving as the IDs of print jobs is displayed. In the list L4, items such as "job name", "format", "information", "size", and so forth of each print job are displayed in this order. Among these print jobs, the print jobs with IDs 1, 2, and 4 have not been executed yet and are in a standby state. The print jobs with IDs 3 and 5 are printing involving overprinting, and it is indicated that these print jobs are currently being printed. In the item J4 "information", as the progress status of printing, the former is displayed such that "overprint uncompleted (3/5)". This indicates that the number of times of overprinting is set as five times; overprinting has been done three out of five times, but printing has not been completed yet. From this fact, it is clear that the remaining number of times of overprinting is two times. The latter is displayed such that "overprint uncompleted (2/4)". This indicates that the number of times of overprinting is set as four times; overprinting has been done two out of four times, but printing has not been completed yet. From this fact, it is clear that the remaining number of times of overprinting is two times.

In other words, the management unit 240 displays here print jobs whose progress status is uncompleted, and additionally displays, among these print jobs, those involving overprinting in this place. The management unit 240 causes the display unit 250 to display, as display reflecting the number of times of additional printing, the progress status including the number of times of additional printing. In this case, the display unit 250 displays, for example, (3/5) and (2/4). Such display presents an operation instruction for instructing a user who operates the printer to perform the remaining operation necessary for completing each of the print jobs.

Although FIG. 7 illustrates pending print jobs besides print jobs involving overprinting, pending print jobs may not be displayed, and a list of print jobs that have not reached the number of times of additional printing may be displayed on the display unit 250.

FIG. 8 is a diagram illustrating a second example where the display unit 250 performs display reflecting the number of times of additional printing.

The illustrated example describes the case where the display unit 250 displays an uncompleted job list L5, which is a list of print jobs that have not reached the number of times of additional printing, in a window W5. The uncompleted job list L5 is displayed when an overprint-uncompleted tab T5 is selected. In the uncompleted job list L, the progress status of IDs 1 to 5 serving as the IDs of print jobs is displayed. In the list L5, items such as "job name", "format", "overprint", "size", and so forth of each print job are displayed in this order. The print jobs with IDs 1 to 5 are all printing involving overprinting, and it is indicated that these print jobs are currently being printed. In the item J5 "overprint", as the progress status of printing, the print job with ID 1 is displayed as "(1/2)". This indicates that the number of times of overprinting is set as two times; overprinting has been done one out of two times, but printing has not been completed yet.

Although the progress status of printing is indicated by a character string such as (3/5) in the above-described example, the way to indicate the progress status is not limited to this example. For example, a progress bar may be displayed, and the progress status may be displayed using animation and in percentage.

Figure 9:
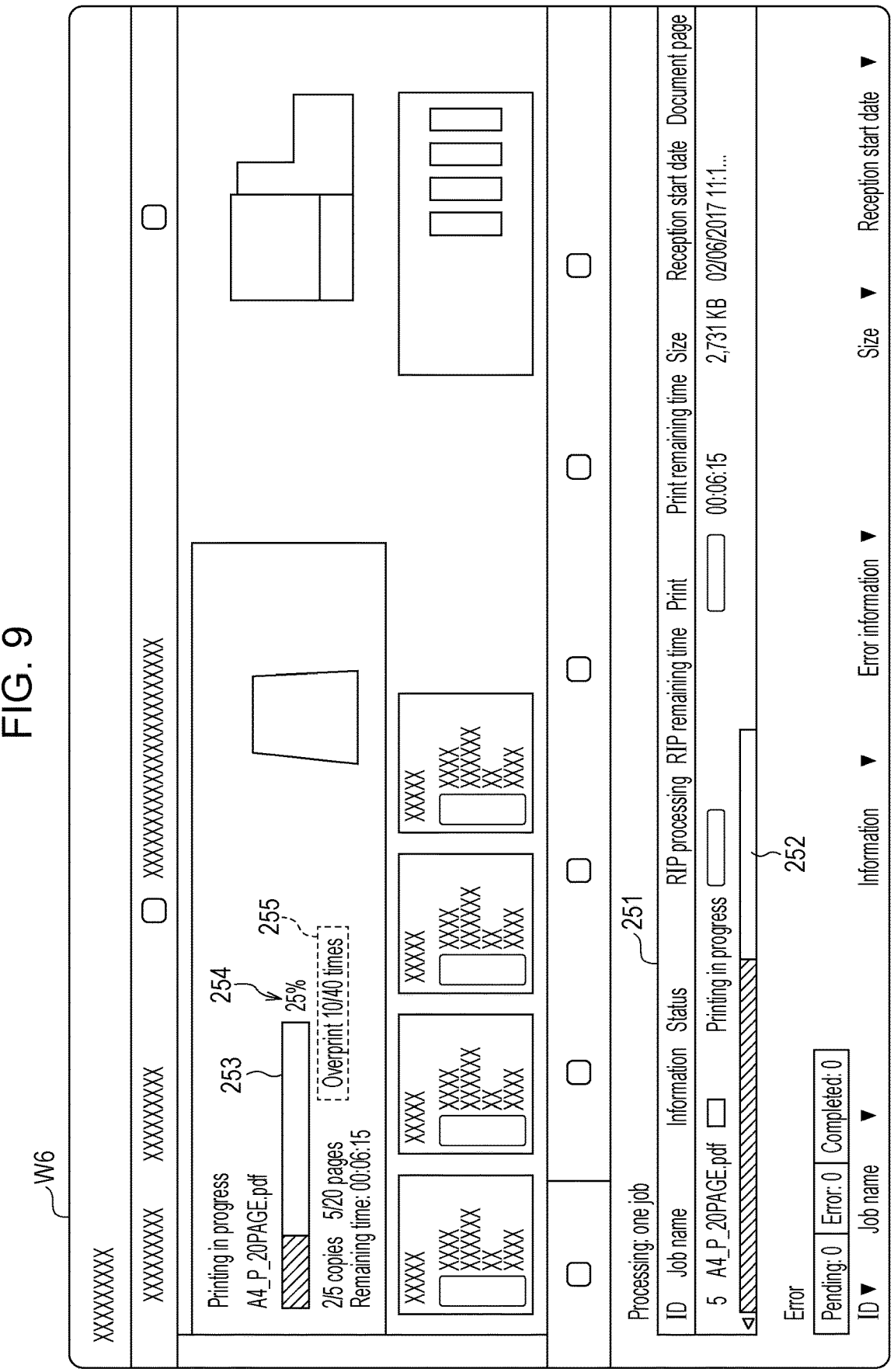
FIG. 9 is a diagram illustrating a third example where the display unit performs display reflecting the number of times of additional printing.

FIG. 9 is a diagram illustrating a third example where the display unit 250 performs display reflecting the number of times of additional printing.

The illustrated example describes the case where the display unit 250 displays the progress status of a print job involving overprinting using a progress bar. Here, this print job is displayed in a field 251. In this case, this print job is the print job with ID 5. The progress status of the print job with ID 5 is displayed using a progress bar 252. Furthermore, in this case, the progress status of all print jobs involving overprinting, including the print job with ID 5, is displayed on a progress bar 253, and also displayed in percentage in a field 254. Furthermore, in this case, the number of times of overprinting in all the print jobs involving overprinting is 40 times, and "overprint 10/40 times", which indicates that overprinting is done 10 out of 40 times, is displayed in a field 255.

The management unit 240 may interrupt printing while in progress. In the case of resuming printing, printing may be started from the point of interruption.

Figure 10:
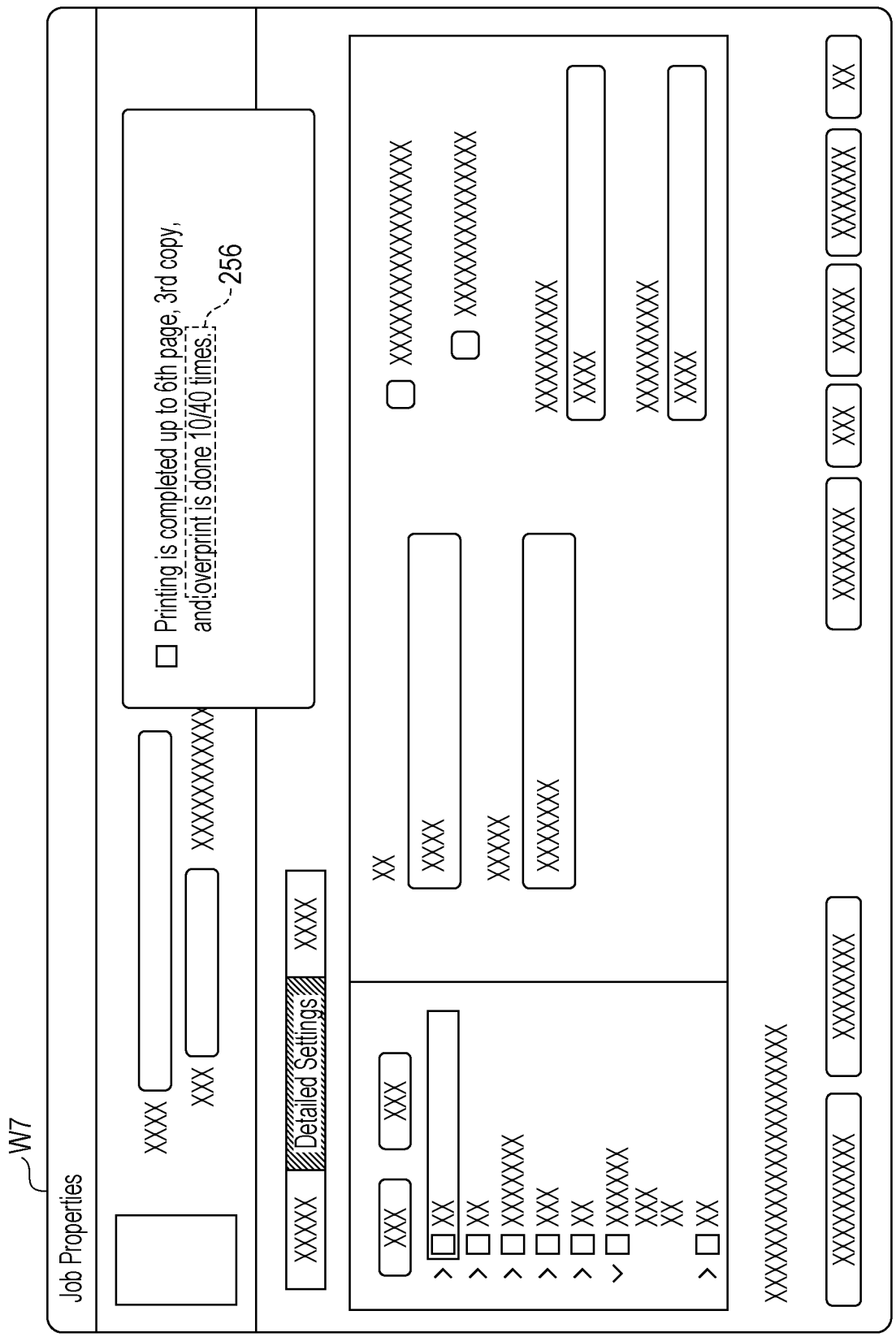
FIG. 10 illustrates a job property window displayed on the display unit when printing is interrupted and then resumed in the state illustrated in FIG. 9.

FIG. 10 illustrates a job property window W7 displayed on the display unit 250 when printing is interrupted and then resumed in the state illustrated in FIG. 9.

As illustrated in FIG. 10, "overprint 10/40 times" is displayed in a field 256, which serves as the progress status of a print job at the point of interruption, in the window W7.

In contrast, even when the completion condition is not satisfied, the management unit 240 is able to complete the print job when further printing is unnecessary. In short, in the case of overcoating using a clear toner or the like, when the user checks the finish of printing and determines that further overcoating is unnecessary, the user may input an instruction to quit printing. In other words, a print job force-quit instruction given from a user who operates the printer is accepted.

Figure 11:
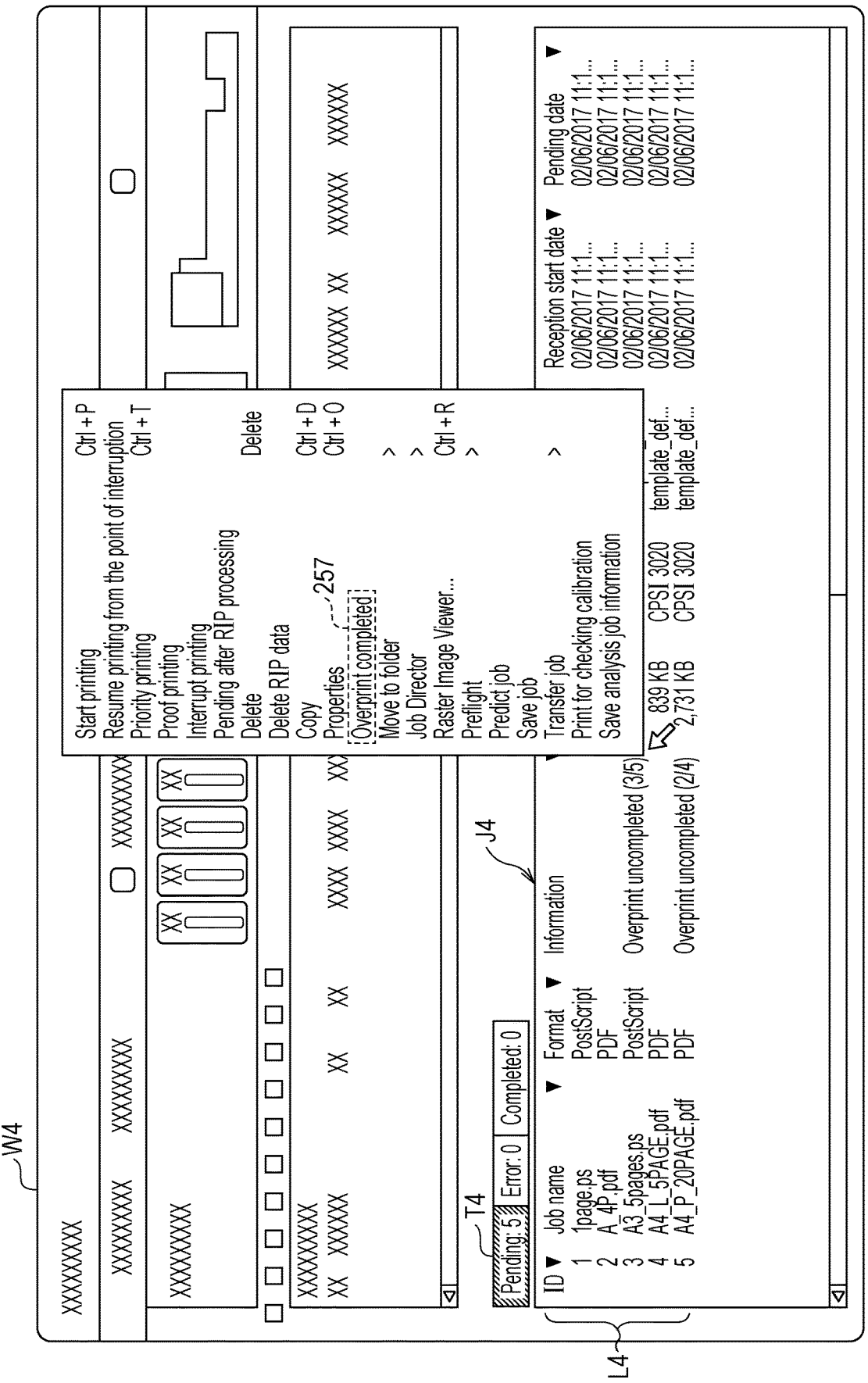
FIG. 11 is a diagram illustrating the case of inputting, by a user, an instruction to quit printing while in progress.

FIG. 11 is a diagram illustrating the case of inputting, by a user, an instruction to quit printing while in progress.

The illustrated example describes the case where the user inputs an instruction to quit printing from the screen illustrated in FIG. 7. Here, it is indicated that the user has selected the print job with ID 3 from the window W4, and then has selected an item 257 "overprint completed" from the menu. Accordingly, for the print job with ID 3, the management unit 240 performs processing to complete the print job.

Description of Instruction Unit 260

The instruction unit 260 instructs the image forming apparatus 10, which performs printing, on the details of processing.

In the present exemplary embodiment, the instruction unit 260 changes the amount of the special toner between the case of using both the normal toners and the special toner in one print operation and the case of overprinting the special toner on the normal toners.

Figure 12A:
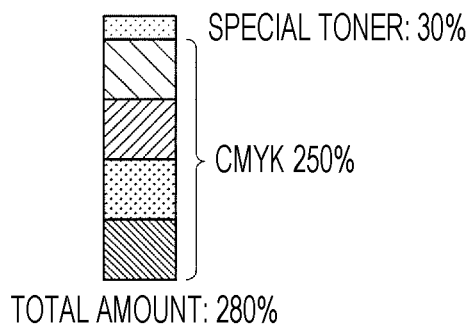
FIG. 12A is a diagram illustrating the relationship between the amount of normal toners and the amount of a special toner in the case of using both the normal toners and the special toner in one print operation.

FIG. 12A is a diagram illustrating the relationship between the amount of the normal toners and the amount of the special toner in the case of using both the normal toners and the special toner in one print operation.

In the case of printing color materials on a recording material, normally, there is a total amount regulation of color materials. Here, the term "total amount regulation" refers to the upper limit of the total amount of color materials usable in one print operation. The total amount regulation is determined by the mechanical restrictions of the image forming apparatus 10. In other words, each of the CMYK colors, which are the normal toners, and each special toner may have a concentration of 0% to 100% in printing; it is controlled that the total amount of the toners used does not exceed the total amount regulation.

FIG. 12A illustrates an example where, because the upper limit according to the total amount regulation is 280% and the total amount of the concentrations of the individual CYMK colors is 250% in FIG. 12A, only a concentration of 30% is allowed for the special toner. In short, in this case, it is necessary to restrict the concentration of the special toner.

Figure 12B:
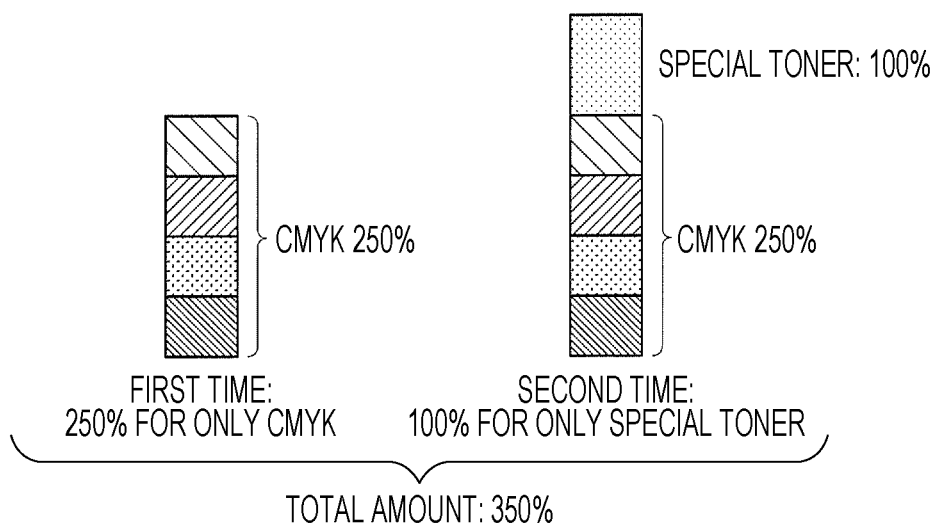
FIG. 12B is a diagram illustrating the relationship between the amount of normal toners and the amount of a special toner in the case of overprinting the special toner on the normal toners.

In contrast, FIG. 12B is a diagram illustrating the relationship between the amount of the normal toners and the amount of the special toner in the case of overprinting the special toner on the normal toners.

Here, the described case is such that printing in which the total amount of concentrations of the individual CMYK colors is 250% is performed in the first print operation, and printing in which the concentration of the special toner is 100% is performed in the second print operation. In this case, the total amount of concentrations of all the toners is 350%. However, because both the first print operation and the second operation are within the total amount regulation, printing is possible. In the second print operation, the special toner is usable with a concentration of 100%. In short, in this case, it is unnecessary to restrict the concentration of the special toner.

As has been described above, the instruction unit 260 changes the amount of the special toner between the case of using both the normal toners and the special toner in one print operation and the case of overprinting the special toner on the normal toners. In short, the concentration of the special toner is changed to comply with the total amount regulation.

In the present exemplary embodiment, the instruction unit 260 outputs operation instruction information to the image forming apparatus 10. Here, the term "operation instruction information" is information for giving instructions on an operation necessary for satisfying a completion condition of a print job. In short, in the case of performing printing multiple times, operation instruction information is information for instructing the user on an operation when performing subsequent printing after printing is performed one time. The instruction unit 260 causes, for example, operation instruction information to be printed. Specifically, the instruction unit 260 causes marks serving as operation instruction information to be printed, which represent a progress status reflecting the number of times of additional printing, and the paper feeding direction of a recording material.

Figure 13A:
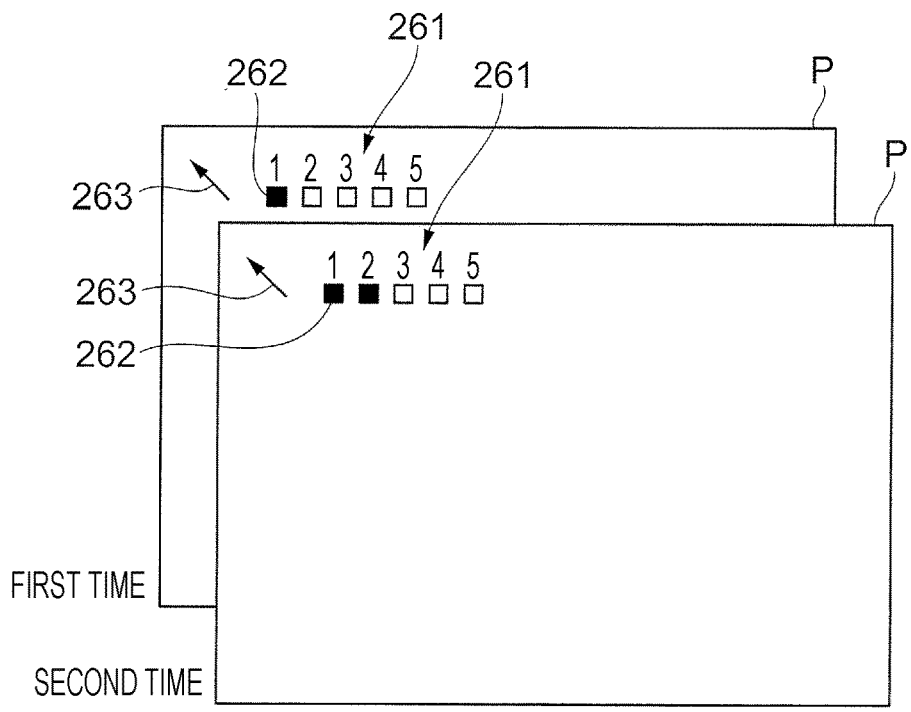
FIGS. 13A and 13B illustrate the cases where marks representing a progress status reflecting the number of times of additional printing, and the paper feeding direction of a recording material are printed.
Figure 13B:
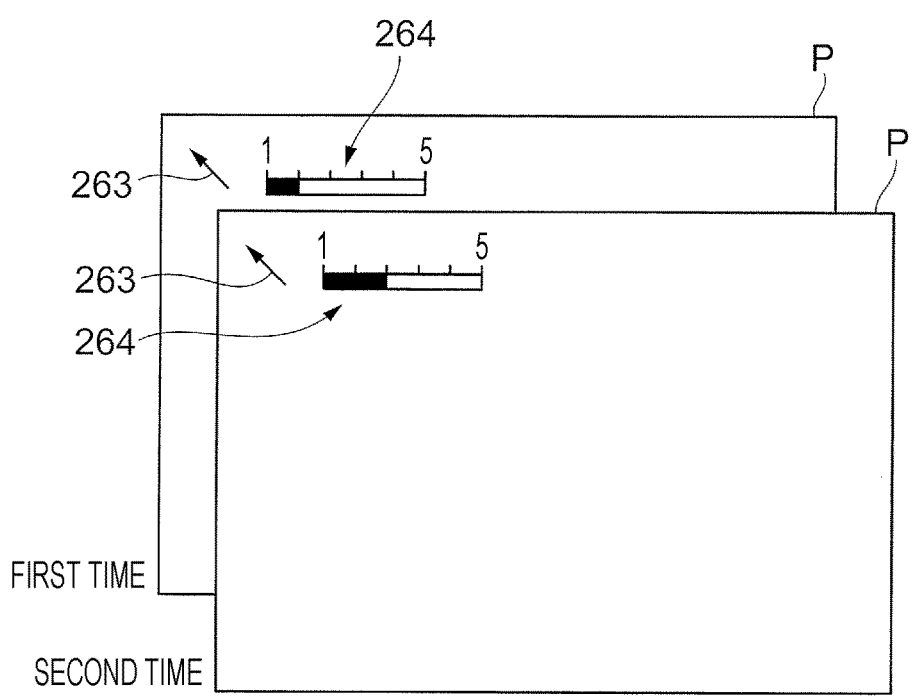

FIGS. 13A and 13B illustrate the cases where marks representing a progress status reflecting the number of times of additional printing, and the paper feeding direction of a recording material are printed.

In the example illustrated in FIG. 13A, checkboxes 262 are used on a recording material P as marks indicating how many times printing is performed, which serves as the progress status of printing. Here, the number of times of printing is five times, and the number of times of printing is indicated by numerals 261 (1 to 5) and the number of the checkboxes 262. The number of times of printing is indicated by the number of checked checkboxes 262. In other words, in the first print operation, the number of checked checkboxes 262 is one, and the remaining four checkboxes 262 remain unchecked. In the second print operation, the number of checked checkboxes 262 becomes two, and the remaining three checkboxes 262 remain unchecked.

Furthermore, in FIG. 13A, an arrow mark 263 is printed on the recording material P as a mark representing the paper feeding direction of the recording material. The user simply feeds paper such that the paper will be directed to, for example, upper left, which is the direction in which the arrow mark 263 faces.

In the example illustrated in FIG. 13B, a progress indicator 264 is used on the recording material P as a mark indicating how many times printing is performed, which serves as the progress status of printing. Here, the total number of times of printing is five times, and the number of times of printing is indicated by the length of a colored portion of the progress indicator 264. In the first print operation, the length of the colored portion of the progress indicator 264 is short. In the second print operation, the length of the colored portion of the progress indicator 264 becomes longer. That is, this length becomes longer as the number of times of printing becomes greater.

In FIG. 13B, as in FIG. 13A, the arrow mark 263 is printed on the recording material P as a mark representing the paper feeding direction of the recording material.

It is preferable to print such marks outside the finish range of a print job. This corresponds to, for example, a margin or an area for writing memo. In addition, such marks may be printed on a recording material (a banner sheet or a cover) different from a print medium printed by a print job. It is also preferable to print marks only for the additional printing as the number of times of printing becomes greater. Although the type of toners for printing such marks is not particularly limited, it is preferable not to use a toner such as a clear toner that is difficult to see when printed. For a user who operates the printer, the arrow mark 263 and the progress indicator 264 operate as operation instructions. In such a case, even when the print server 50, which serves as a higher-level apparatus that manages a series of workflows related to a print job, gives an operation instruction to execute the print job to a user who operates the printer, there are some cases where no specific instructions are given on what steps are involved in completing the print job. In the present exemplary embodiment, in place of the higher-level apparatus, the controller 20 presents operation instructions necessary for completing the print job to a user who operates the printer. Although the operation instructions are printed on a recording material in the above description, the operation instructions may be displayed on the display unit 250 of the controller 20 or on a display unit (not illustrated) of the image forming apparatus 10.

Furthermore, in the present exemplary embodiment, the instruction unit 260 changes, depending on how many times additional printing is performed, the setting of whether to perform printing from the first page or the last page, and the setting of the ejection face of the recording material.

Here, "the setting to perform printing from the first page" is the setting to perform overprinting from the first page to the last page. To make this setting, for example, the setting "print from the last page" is turned off in the job property settings. In addition, "the setting to perform printing from the last page" is the setting to perform printing from the last page to the first page. To make this setting, for example, the setting "print from the last page" is turned on in the job property settings.

Furthermore, "the setting of the ejection face of the recording material" is the setting of whether to eject the print medium with its front side up or back side up. Hereinafter, the setting to eject the print medium with its front side up may be referred to as "front side ejection", and the setting to eject the print medium with its back side up may be referred to as "back side ejection". To make this setting, for example, the setting "front side ejection" or "back side ejection" is selected in the job property settings.

For example, it is assumed that the number of times of overprinting is N times, and, in the N-th overprint operation for finally ejecting the print medium, the settings "single-sided printing, front side ejection, and print from the last page is turned on" are made. In this case, when printing is performed with the settings "single-sided printing, front side ejection, and print from the last page is turned off" in the (N−1)-th overprint operation, the user is able to re-set the ejected recording material and print the recording material as it is.

In the exemplary embodiment, the instruction unit 260 changes the job property settings in accordance with the number of times of overprinting (the number of times of additional printing) and how many times overprinting is performed.

For example, in the above-described example, when the number of times of overprinting is N times, in the (N−2k)-th print operation, the settings "single-sided printing, front side ejection, and print from the last page is turned on" are made. In addition, in the (N−2k−1)-th print operation, the settings "single-sided printing, front side ejection, and print from the last page is turned off" are made.

Although the above-described example discusses the case of single-sided printing, the case of double-sided printing may be, for example, as follows.

For example, it is assumed that the number of times of overprinting is N times, and, in the N-th overprint operation for finally ejecting the print medium, the settings "double-sided printing, back side ejection, and print from the last page is turned off" are made. In this case, when printing is performed with the settings "double-sided printing, front side ejection, and print from the last page is turned on" in the (N−1)-th overprint operation, the user is able to re-set the ejected recording material and print the recording material as it is.

Likewise, when the number of times of overprinting is N times, in the (N−2k)-th print operation, the settings "double-sided printing, back side ejection, and print from the last page is turned on" are made. In addition, in the (N−2k−1)-th print operation, the settings "double-sided printing, front side ejection, and print from the last page is turned off" are made.

As has been described above, by changing the job property settings by the instruction unit 260, the user is able to re-set the ejected recording material and print the recording material as it is, thereby improving the user's convenience.

Description of Operation of Controller 20

FIG. 14 is a flowchart describing the operation of the controller 20.

Here, the following description is about the exemplary case in which printing is performed using only the normal toners or the normal toners and the special toner in the first print operation, and, from the second print operation onward, the process is divided into two cases, that is, the case of overcoating the special toner and the case of not overcoating the special toner. Hereinafter, overprinting refers to overcoating.

At first, the transmitter/receiver 210 accepts a print job from the print server 50 (step S101).

Next, the spooling unit 220 temporarily spools the print job accepted by the transmitter/receiver 210 (step S102).

Next, the completion condition obtaining unit 230 sets the number of times overprinting is executed, which is the number of times overprinting done so far, to zero (step S103).

Furthermore, the completion condition obtaining unit 230 obtains a completion condition from the user (step S104). The completion condition may be obtained using, for example, the method illustrated in FIGS. 5 to 6.

The completion condition obtaining unit 230 determines whether the number of times of overprinting the special toner is zero (step S105).

If the determination result indicates that the number of times of overprinting the special toner is zero (to perform no overcoating) (YES in step S105), the management unit 240 applies control to obtain the corresponding print data spooled in the spooling unit 220, and to output the print data to the image forming apparatus 10. In this case, printing using only the normal toners or the normal toners and the special toner, which corresponds to the first print operation, is performed (step S106). Then, the process ends.

In contrast, if the number of times of overprinting the special toner is not zero (to perform overcoat printing) (NO in step S105), the management unit 240 determines the number of times overprinting is executed, which is the number of times overprinting done so far (step S107).

If the determination result indicates that the number of times overprinting is executed is zero (in the case of the first print operation), the management unit 240 performs printing using only the normal toners or the normal toners and the special toner (step S108). At this time, marks such as those illustrated in FIGS. 13A and 13B may be printed in response to an instruction from the instruction unit 260.

If the number of times overprinting is executed is one or greater and less than or equal to (the number of times of overprinting the special toner−2), the management unit 240 performs printing using only the special toner (step S109).

Furthermore, if the number of times overprinting is executed is (the number of times of overprinting the special toner−1), the management unit 240 performs printing using only the special toner (step S110). Then, 1 is added to the number of times overprinting is executed (the number of times overprinting is executed+1) (step S111), and the process ends.

From steps S107 and S108 onward, the management unit 240 adds 1 to the number of times overprinting is executed (the number of times overprinting is executed+1) (step S112).

The management unit 240 determines that the print job is uncompleted, and adds the print job to the pending list L4, illustrated in FIG. 7, or the uncompleted job list L5, illustrated in FIG. 8 (step S113). At this time, the display unit 250 may perform display illustrated in FIGS. 7 to 9.

The user re-sets the printed recording material, and the transmitter/receiver 210 accepts a print instruction (step S114). Thereafter, the process returns to step S107.

Although the above-described example is about the case of a print job for performing printing multiple times on each page, the example is not limited to this case. For example, by inputting a completion condition of a print job by the user, a completion condition different from a normal print job completion condition may be set, thereby executing a print job.

According to the above-described exemplary embodiment, a completion condition of a print job may be set by the controller 20 side. On the basis of this completion condition, when executing a print job which satisfies a predetermined condition, such as that printing is performed multiple times on each page, the print job is managed as uncompleted. As a result, it may be prevented from determining that a print job that is still being processed is completed.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print control apparatus comprising:
  a controller configured to
    obtain a completion condition of a print job when executing the print job for printing one or more pages satisfying a predetermined condition; and
    manage the print job as uncompleted until the obtained completion condition is satisfied even when a recording material on which the one or more pages are printed is ejected, wherein
  the predetermined condition is printing in color using both normal color materials and special color materials,
  the completion condition is a total of a number of times of printing and a number of times of additional printing on each page,
  the controller does not execute subsequent processing until the print job is completed, and
  even when the completion condition is not satisfied, the controller is configured to cause the print job to be completed when no further printing is necessary.

2. The print control apparatus according to claim 1, wherein the print job is a print job for performing printing a plurality of times on each page.

3. The print control apparatus according to claim 2, wherein, when the print job uses a normal color material that is a color material used normally and a special color material that is used specially for the print job, the print job performs printing a plurality of times.

4. The print control apparatus according to claim 3, wherein the controller is configured to separately obtain the number of times of additional printing for overprinting the special color material on top of the normal color material and for overprinting the special color material on bottom of the normal color material.

5. The print control apparatus according to claim 2, wherein the controller is configured to cause a display to display the number of times of additional printing.

6. The print control apparatus according to claim 5, wherein the controller is configured to cause the display to display a list of print jobs that have not reached the number of times of additional printing.

7. The print control apparatus according to claim 5, wherein the controller is configured to cause the display to display a progress status including the number of times of additional printing.

8. The print control apparatus according to claim 2, wherein:
  the controller is configured to give an instruction on details of processing to a print unit that performs printing.

9. The print control apparatus according to claim 8, wherein the controller is configured to change an amount of a special color material used specially for the print job between (a) using both a normal color material that is a color material used normally and the special color material in one print operation and (b) overprinting the special color material on the normal color material.

10. The print control apparatus according to claim 8, wherein the controller is configured to output, to the print unit, operation instruction information for giving an instruction on an operation necessary for satisfying the completion condition of the print job.

11. The print control apparatus according to claim 10, wherein the controller is configured to cause the operation instruction information to be printed.

12. The print control apparatus according to claim 11, wherein the controller is configured to cause a mark serving as the operation instruction information to be printed, the mark representing a progress status reflecting the number of times of additional printing and/or a paper feeding direction of a recording material.

13. The print control apparatus according to claim 8, wherein the controller is configured to change, depending on how many times additional printing is performed, a setting of whether to perform printing from a first page or a last page, and a setting of an ejection face of a recording material.

14. The print control apparatus according to claim 1, wherein the controller does not execute a subsequent print job, post-processing, or deletion of the print job until the print job is completed.

15. A printer comprising:
a print unit that performs printing on a recording material using a color material; and
a print controller that controls the print unit on the basis of a print job,
wherein the print controller is configured to
obtain a completion condition of the print job when executing the print job for printing one or more pages satisfying a predetermined condition; and
manage the print job as uncompleted until the obtained completion condition is satisfied even when a recording material on which the one or more pages are printed is ejected, wherein
the predetermined condition is printing in color using both normal color materials and special color materials,
the completion condition is a total of a number of times of printing and a number of times of additional printing on each page,
the print controller does not execute subsequent processing until the print job is completed, and
even when the completion condition is not satisfied, the print controller is configured to cause the print job to be completed when no further printing is necessary.

16. A print system comprising:
a print unit that performs printing on a recording material using a color material;
a print controller that controls the print unit on the basis of a print job; and
a print server that transmits the print job to the print controller and manages progress of the print job,
wherein the print controller is configured to
obtain a completion condition of the print job when executing a print job for printing one or more pages satisfying a predetermined condition; and
manage the print job as uncompleted until the obtained completion condition is satisfied even when a recording material on which the one or more pages are printed is ejected, wherein
the predetermined condition is printing in color using both normal color materials and special color materials,
the completion condition is a total of a number of times of printing and a number of times of additional printing on each page,
the print controller does not execute subsequent processing until the print job is completed, and
even when the completion condition is not satisfied, the print controller is configured to cause the print job to be completed when no further printing is necessary.

17. The print system according to claim 16, wherein the controller is configured to notify the print server of completion of the print job when the print job satisfies the completion condition.

18. The print system according to claim 16, wherein the controller is configured to notify the print server that the print job is uncompleted when the print job does not satisfy the completion condition even when a recording material on which the one or more pages are printed is ejected.

* * * * *